March 6, 1962  J. E. CHAUVINEAU  3,024,386
CAPACITOR FLASH LIGHT SYSTEM
Filed July 22, 1959
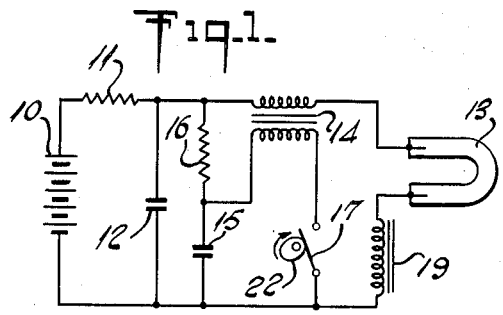
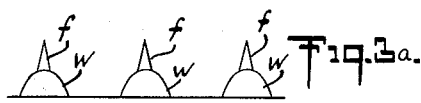
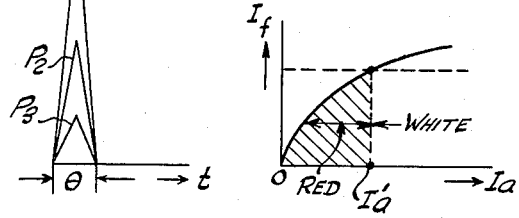
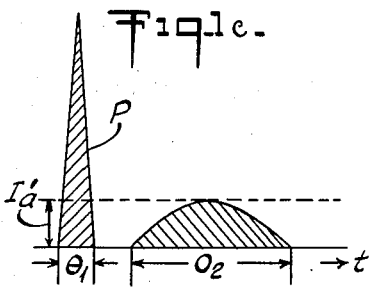
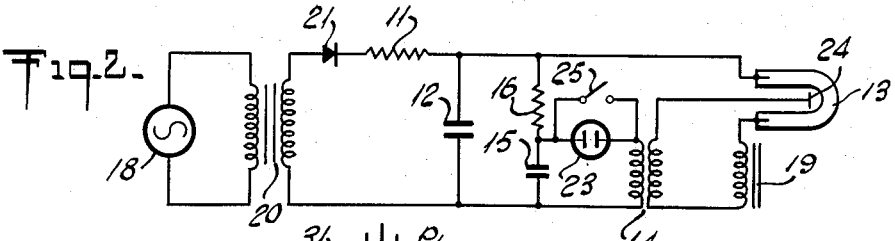
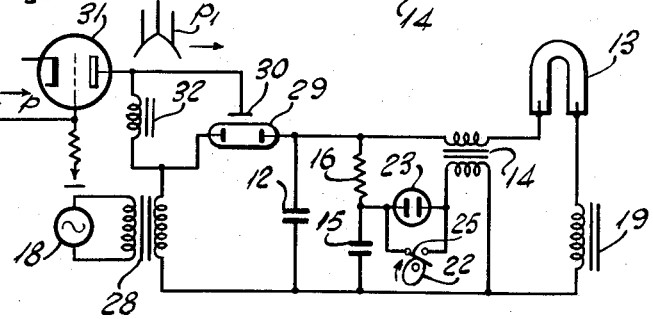
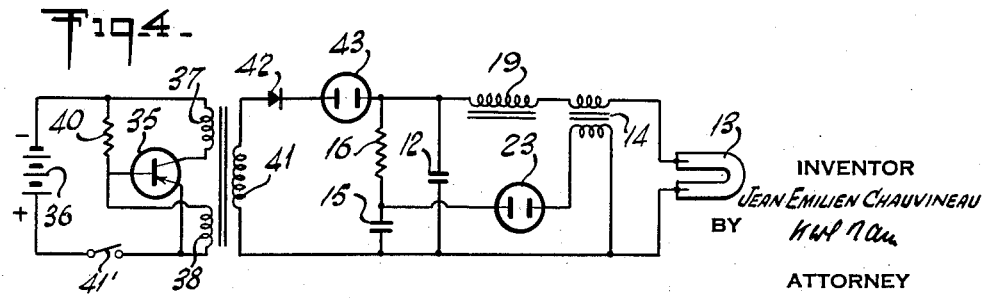
INVENTOR
JEAN EMILIEN CHAUVINEAU
BY
ATTORNEY

United States Patent Office 3,024,386
Patented Mar. 6, 1962

3,024,386
CAPACITOR FLASH LIGHT SYSTEM
Jean Emilien Chauvineau, 6 Rue Charles Lecoq, Lozere (Seine-et-Oise), France, assignor of fifty percent to Karl Rath, New York, N.Y.
Filed July 22, 1959, Ser. No. 828,853
Claims priority, application France July 25, 1958
8 Claims. (Cl. 315—183)

The present invention relates to capacitor flash lights and has for its main object to adapt the conventional flash light system for the production of a high power colored light flash suitable for use as a light signal, or as a warning, emergency or the like light source or flare of high instantaneous intensity.

As is will known, the conventional capacitor flash lights as used for photographic, stroboscopic and the like purposes, comprise essentially a source of high voltage D.C. (battery, rectifier power supply, etc.) and a storage capacitor arranged to be charged by said source and to be subsequently discharged through a gaseous discharge or luminous flash tube, to result in a short or instantaneous ionic discharge current through the tube of high peak value and accompanied by a luminous flash of high instantaneous light intensity. The flash discharge may be initiated, in a known manner, by an ionizing pulse or high voltage surge applied to the tube electrodes directly or to a separate starting or control electrode.

Since the impedance of a gaseous discharge tube during the period of the breakdown or ionic discharge has an extremely low value, approaching practically the condition of a short-circuit, the peak discharge current assumes an extremely high instantaneous value, being of the order of several thousands of amperes and more, with the discharge time or duration of the flash being of a short value varying from $1/1000$ sec. to about $1/100000$ sec. for tubes of conventional design and construction.

In order to obtain light closely resembling the quality or characteristics of daylight or of a spectral composition suitable as a photographic light source, the conventional flash light tubes utilize either a xenon, crypton or argon gas, or a mixture of such gases, as an ionizing medium at greatly reduced pressure. This ensures both maximum efficiency or light output of the tube, as well as a color composition resembling the spectral sensitivity characteristics of daylight, as well as of the modern panchromatic photographic film or the like light sensitive material.

The suitability of a capacitor flash light as a flare or emergency light source, being predicated primarily on the high intensity or brightness of the flash discharge, has been previously realized and attempts have been made to utilize and adapt this type of flashing light source for use as a signal source for traffic control or the like, or as a flare replacing the conventional low power flashing lights comprising a low voltage current source and a current interrupter producing a continuous flashing effect, such as in the form of thermostatic flashers, a low voltage oscillator or multi-vibrator and the like, energizing a low voltage electric light bulb.

In most such uses, that is, outside the photographic field, a colored flash instead of a white flash is required, in particular, a red light flash capable of penetrating fog or haze and suitable for general uses as a signal light, flare or the like light source. Attempts to utilize a conventional capacitor flash light device of the photographic or the similar type in conjunction with a filter to segregate a desired color or partial spectral range from the white light emitted by the flash, have been practically unsuccessful mainly on account of the substantial loss or energy absorption of the undesired component or components of the white light by the filter mounted upon or being directly embodied in the glass wall of the tube. In order to make up for this loss, the size and bulk of the apparatus or its storage capacity in watt-seconds would have to be increased to an extent as to render the use of such a light source entirely unsuitable, if not prohibitive, for both practical and economical reasons.

Accordingly, an important object of the present invention is the provision of a high intensity capacitor flash light source adapted to produce light of a desired pure or saturated color, such as red for neon and blue-green for mercury gas used as an ionizing medium, directly by the flash discharge and without requiring the use of a color filter or involving loss of light emitted by the flash.

Another object of the invention is the provision of means to directly produce light of a pure (saturated) color being characteristic of the rarified gas or ionizing medium of a capacitor flash light source, substantially without reducing the efficiency in converting electrical energy into light energy by the flash discharge.

A more specific object of the invention is the provision of a high intensity capacitor flash light source suitable as a flare and utilizing a flash tube containing neon gas at low pressure as an ionizing medium and adapted to directly produce a red or orange-red light flash by the ionic or flash discharge through the tube, substantially without requiring any filters or energy absorbing elements.

Yet another object of the invention is the provision of a high intensity capacitor flash light source suitable as a flare and utilizing a flash tube containing mercury gas at low pressure as an ionizing medium and adapted to directly produce a flash of blue-green color by the ionic discharge through the tube, substantially without requiring any filters or energy absorbing elements.

Another object of the invention is the provision of a colored capacitor flash light source of the above type which is both simple in design, efficient in operation, as well as inexpensive in fabrication, compared with conventional capacitor flash light devices designed to produce a colored light output known in the art.

The conventional capacitor flash light source using argon, crypton or xenon as an ionizing gas is furthermore basically unsuited as a flare or the like signal light source on account of the relatively short duration of the flash which makes it difficult to attract or retain the attention of the eye's retina. While flashing periods of $1/1000$ sec. and less are especially suitable for photography by arresting rapid motion of fast moving objects and by eliminating the annoying blinding effect on the eye usually experienced with expendable flash light bulbs, flash periods as low as $1/10$ sec. are required for reliable and satisfactory operation of a flare or emergency light source, aside from the change of the spectral composition from white to red or any other saturated or primary color within the visible spectrum.

Accordingly, still another object of the invention is to extend the duration of the flash or discharge period of a capacitor type flash light beyond the value determined by the characteristics or parameters of the circuit, substantially without reducing the power or light output of the flash, to render the device suitable as a signal or the like flashing light source.

The invention, as to its ancillary objects and novel aspects, will be better understood from the following detailed description taken in reference to the accompanying drawing forming part of this specification and wherein:

FIG. 1 is a basic circuit diagram of a capacitor flash light source energized by D.C. current and embodying the improvements of the invention, to produce a flash having a pure or saturated color of extended length or duration;

FIGS. 1A, 1B and 1C are theoretical diagrams explanatory of the function and operation of the invention;

FIG. 2 is a circuit diagram of an improved colored capacitor flash light source constructed in accordance with the principles of the invention and operable from an A.C. power line or network;

FIG. 3 is a circuit diagram of an ionizing impulse-controlled capacitor flash light source of the type constructed according to my copending patent application Serial No. 692,351, filed October 21, 1957, now Patent No. 2,953,721, and embodying the improvement of the present invention;

FIGS. 3A and 3B are theoretical diagrams explanatory of the function and operation of FIG. 3; and FIG. 4 is a wiring diagram of a light weight battery-operated or portable colored flash light device or flare for producing a continuous flashing operation, and being constructed in accordance with the invention.

Like reference characters denote like parts in the different views of the drawing.

In the attempt to produce a colored light flash by replacing the argon, xenon or crypton gas, producing non-saturated or substantially white light in a conventional capacitor flash light device, by a neon or mercury atmosphere normally selectively producing red or blue-green, as known from the conventional neon signs, applicant has discovered that the light produced will be of a pinkish or bluish-white color, that is, practically resembling white light, in substantially the same manner as when using neon or argon gas in a conventional flash light tube. Extensive experiments conducted by applicant to determine the cause of this unexpected phenomenon have shown that, as the intensity of the flash or discharge current is increased from a relatively low to relatively high values, the color of the light emitted, for instance in the case of neon, changes above a critical value of the current from the characteristic or saturated color of the gas, that is, red, to a pastel-like or non-saturated pinkish-white color practically approaching white light, in substantially the same manner as in case of a conventional flash light tube. The same applies to mercury, which results in a bluish-white color gradually merging into white, as the intensity of the current is increased beyond a critical or limit value. The limit value of the current, above which the change occurs from the saturated color to the non-saturated color has been found to be in the neighborhood of or in the order of about 200 amperes from ionizing gases, including neon and mercury. This value is subject to variations, depending upon the type of gas, pressure and other operating characteristics or parameters.

Due to the low impedance of a flash tube in the ionized condition, the only practical way to reduce the current below the critical value mentioned would appear to be by limiting the power output or capacity of the device, whereby to restrict its use to a few applications requiring a relatively low light output or flash intensity, that is, practically foregoing the advantage of the capacitor type flash lighting source.

The present invention substantially overcomes the previous difficulties in a most simple and efficient manner by the provision of a high inductance having a relatively low ohmic impedance and being connected in series with the flash tube and storage capacitor. The effect of this inductance in the discharge circuit is to both reduce the flash peak current to the critical value, to ensure a pure or saturated color of the flash without the use of filters, on the one hand, and to sufficiently lengthen the duration of the flash to render it suitable as a signal flare, emergency or the like flashing light source. As a result of the high rate of change of the current or the relatively steep-fronted peak of the discharge, the inductive effect in limiting the current and in extending the duration of the flash is especially effective, while the low ohmic resistance of the inductance substantially prevents or reduces any power loss to a negligible minimum.

Referring more particularly to FIG. 1 of the drawing, there is shown a basic circuit diagram of a capacitor flash lighting system according to the invention comprising a source of D.C. voltage 10, such as a high voltage battery or the like, arranged to charge a storage capacitor 12 through a high-ohmic charging or protective resistance 11. Upon closing of the circuit, the capacitor is charged in a known maner to the full source voltage according to an exponential charging curve, being determined by the size of the capacitor and the charging resistance, whereupon the energy stored in the capacitor is released or discharged through an ionic or flash discharge tube 13 connected, in the example shown, across the capacitor through the secondary winding of a starting or triggering transformer 14, the cathode of the tube being on the side of the negative pole and the anode being on the side of the positive pole of the source 10. The triggering circuit, shown by way of example, includes an auxiliary capacitor 15 connected across the main storage capacitor 12 in series with an auxiliary charging resistor 16 and having, in turn, connected thereacross the primary winding of the transformer 14 in series with a switch or make and break contact 17 controlled in any suitable manner, such as by a rotating cam 22, as shown in the drawing. Instead of applying the ionizing or triggering pulses directly to the electrodes of the flash tube 13, the same may be impressed upon a separate starting electrode disposed either inside the tube or being applied to the outer wall of the tube, in a manner well known (see FIG. 2).

In a system of this type, closing of the switch 17 will result in the auxiliary capacitor 15 being discharged suddenly through the primary of the transformer 14, whereby to cause a high voltage surge or ionizing pulse to be induced in the secondary winding and impressed upon the electrodes of the flash tube 13. The latter is thus ionized so as to initiate the discharge of the main storage capacitor 12 through the tube in the form of an instantaneous and high intensity current pulse and accompanying light flash, as shown at $P_1$, FIG. 1A. Since the ionization of the gas reduces the impedance of the tube to an extremely low value, the duration or discharge time of the flash is extremely short, being practically of the order of $\frac{1}{1000}$ to $\frac{1}{100,000}$ sec. for capacitor flash lights of conventional design and construction.

FIG. 1B is a plot showing the relation of the luminous or flash intensity $I_f$ as a function of the discharge current $I_a$, assuming the tube to contain a rarified atmosphere, such as neon or mercury as an ionizing medium. As seen from the curve, as the flash current $I_a$ is increased, the intensity $I_f$ increases substantially logarithmically with the color of the emitted light at first corresponding to the characteristic (saturated) color of the gas being used, that is, red for neon and blue-green for mercury, until reaching a critical current or limit $I_a'$, at which point the spectral color changes rapidly into a pinkish-red or green-white gradually approaching white, whereby to render the tube basically unsuitable as a signal flare of high intensity. Experiments have shown that the critical or limit current or change from saturated to non-saturated light for most gases, including neon and mercury, is of the order of 200 amperes peak discharge current.

In other words, the ordinary high intensity capacitor flash light necessarily involves the emission of non-saturated or practically white light, that is, substantially independently of the type of the gas used as an ionizing medium. Theoretically, it may be assumed that with increasing current strength, the emission or release of radiant energy by the gas molecules or atoms upon changing from a higher to a lower energy level passes from a state involving a single or discrete energy levels for small current values into a state involving an extended energy band or number of bands in the case of higher current intensities, whereby to result in a change from a narrow or saturated spectral range or color into an ever wider spectral range gradually approaching white light, in a manner readily understood. At the same time, it is found that the total emitted useful power is reduced substantially by the shift of the entire spectrum towards the infrared or unusable region of the spectrum.

A practical solution, therefore, to produce a desired saturated color of the flash, such as red for neon or blue-green for mercury, would be to decrease the intensity of the flash current by reducing the total power output of the device, as shown at $P_2$ and $P_3$ in FIG. 1A, to such an extent as to reduce or maintain the current below the critical or limit value $I_{a2}$. This, however, would greatly limit the usefulness of a colored capacitor flash light source of this type, thereby defeating the purpose of the invention to provide a high power or a high intensity flash discharge device as a flare or signal light source.

By the present invention, the above problem is solved in a most simple and efficient manner and with no or negligible sacrifice of total flash energy or light output by the insertion of an inductance or preferably iron-cored choke coil 19 in series with the flash tube 13. The inductance coil 19 is advantageously designed to have a minimum of ohmic resistance, such as by the use of low resistivity wire of relatively large cross section compatible with existing design conditions and requirements. The effect of the inductance 19, the practical value of which may be of the order of from 100 to 500 henries for the average practical flash light source or flare, is to both limit the peak value of the flash current to the critical value $I_a'$ and at the same time to extend the period of duration of the flash discharge, as shown at P and P' and $\theta_1$ and $\theta_2$, respectively, FIG. 1C, substantially without loss of energy, as represented by the equal cross-hatched areas in the drawing.

The reduction of the current from the peak value P to the value P' does not appreciably affect the brilliance of the light emitted due to the logarithmic relation as shown in FIG. 1B, as well as on account of the physiological characteristics of the human eye, thus resulting in a flash of equal total energy but greatly increased length and having a substantially pure (saturated) color characteristic of the gas being used as an ionizing medium. Thus, the use of a flash tube containing neon will result in a red or orange-red light flash, while mercury will result in intense blue-green color being extremely rich in ultra-violet and enabling the use of a suitable phosphor in the form of a translucent layer upon the tube wall, to produce any other desired color of the flash, such as blue or yellow, in a manner well known from the conventional fluorescent light or illumination devices.

FIG. 2 shows a circuit for a colored capacitor flash light being operated by an A.C. power source 18, such as a 60 cycle lighting circuit or network, through a step-up transformer 20 and rectifier 21, to produce high-voltage D.C. replacing the battery 10 of FIG. 1. There is further shown in FIG. 2 an auxiliary oscillating circuit to effect a continuous flashing of the tube and taking the place of the interrupter 17 and cam 22 of FIG. 1, said circuit, in the example shown, constituting a self-running relaxation oscillator comprising the auxiliary charging resistor 16, capacitor 15 and a gaseous discharge tube 23 connected across the capacitor 15 in series with the primary winding of the triggering transformer 14. The latter, in the example shown, has its secondary connected to the auxiliary starting electrode 24 of the flash tube 13. As a consequence, upon charging of the capacitor 15 through resistor 16 to the breakdown voltage of the tube 23, the capacitor is discharged in the same manner as by closing of the switch 17 of FIG. 1, thus triggering the flash tube and initiating the flash discharge. The capacitor 15 is then recharged through the resistance 16 and a new flash initiated in the same manner. The oscillating period of the oscillator 15, 16, 23, being determined in a known manner by the values of the capacitor 15 and resistance 16, should be sufficient to allow the storage capacitor 12 to be charged to the full source voltage between successive triggering pulses. The choke coil 19 again serves to limit the discharge current to the critical value for ensuring a colored flash, as well as to extend the flash period, in the manner described hereinabove In order to control the operating time or number of the periodic light pulses, there is further shown a switch 25 for short-circuiting the tube 23.

FIG. 3 illustrates a capacitor flash system for producing a light output with a capacitor 12 of limited capacitance, as disclosed in my above-mentioned copending patent application, by providing an additional intermittent energy supply to the flash tube 13 directly from the source 18 through the transformer 28 and a further gaseous discharge tube 29 acting both as a unidirectional conductor or rectifier, as well as an intermittent switch to prevent damage to or destruction of the flash tube while being directly connected to the power source. For this purpose, the tube 29 is ionized intermittently at a rate substantially above the frequency of the source 18 by a series of high-voltage ionizing pulses $p'$ produced by a peaking amplifier 31 having its anode supplied by the source 18 through transformer 28 and having its grid controlled by a square voltage wave $p$, to result in a series of high-voltage peaks or pulses $p'$ by the action of the peaking choke coil or inductance 32 inserted in the anode circuit of the amplifier 31. The pulses may control the switch tube 29 through a special control electrode 30 or in any other suitable manner. As a result, the capacitor 12, which in this case may have a size substantially less than in the case of FIG. 2 for an equal light output of the flash, is charged intermittently, say at a rate of from 1000 to 5000 per sec., and subsequently discharged through the tube 13 in the ordinary manner, to produce a colored light flash of extended duration due to the action of the choke coil 19. However, since the tube 29 has its impedance reduced intermittently to practically zero by the impulse voltage $p'$, additional power will be directly drawn by the flash tube directly from the source 18, as shown at $f$, FIGS. 3A and 3B, to result in a substantial intensification of the flash discharge, as described in greater detail in said copending application. The flashing operation may again be controlled by the auxiliary relaxation oscillator 15, 16, 23, the latter being, in turn, controlled by the switch 25 through cam 22 or in any other suitable manner. Depending upon the design of the circuit, the capacitor 12 may be fully charged during a single or multiple number of periods or half-waves $w$ of the alternating supply current, to control the flashing rate of the circuit, as shown by FIG. 3A and 3B, respectively, and described in greater detail in the above-mentioned copending application.

FIG. 4 shows a circuit diagram of a simplified signal flash light or flare according to the invention, being operated by a low voltage source, such as battery 36, through a D.C. transformer in the form of a transistor oscillator 35, step-up transformer and high-voltage rectifier 42. The transistor oscillator being powered by the source 36 comprises a collector coil 37 regeneratively coupled with a control (feedback) coil 38 in the base-emitter circuit of the transistor which further includes a biasing resistor 40. The oscillations, after being stepped up to a sufficient high voltage in the secondary winding 41, coupled with coils 37 and 38, are rectified to provide high-voltage D.C. for charging both the storage capacitor 12 and the auxiliary capacitor 15, in the manner described and understood from the foregoing. In the example shown, the relaxation oscillator 15, 16, 23, controlling the flash rate operates continuously, the device being turned on and off by a switch 41' in series with the low voltage battery 36 or in any other suitable manner. In order to protect the transistor 35 from inductive or high voltage surges caused by the choke 19, an excess voltage arrester in the form of a further gas tube 43 or the like is advantageously connected between the high voltage source and flash circuit.

In the foregoing, the invention has been described with reference to a few specific illustrative devices. It will be evident, however, that variations and modifications, as well as the substitution of equivalent elements for those shown herein for illustration may be made, without departing from the broader scope and spirit of the invention as set forth in the appended claims. The specification and drawing are accordingly to be regarded in an illustrative rather than in a limiting sense.

I claim:
1. A capacitor flash light source comprising a source of high-voltage direct current, a capacitor, means to charge said capacitor by said source, an ionic flash discharge tube containing a rarified gas, means to discharge said capacitor through said tube, said tube upon direct energization by the capacitor charge being effective to produce a discharge current of relatively high peak value and short duration so as to normally result in a substantially non-saturated color of said flash independently of the nature of said gas, and inductive impedance means connected in series with said tube having a value sufficiently large to substantially reduce the flash peak current and to increase the duration of the flash discharge such as to change from said non-saturated color to a flash of substantially saturated color characteristic of the nature of the gas contained in said tube.

2. In a capacitor flash light source as claimed in claim 1, said second means being comprised of an auxiliary capacitor arranged to be charged by said source, a triggering transformer having a secondary winding connected to said tube, and a switch to connect said auxiliary capacitor to the primary winding of said transformer, to apply a discharge-initiating high-voltage surge to said tube.

3. In a capacitor flash light source as claimed in claim 1, a protective impedance in series with said source and tube to normally prevent a direct discharge of said tube by said source, said second means being comprised of a relaxation oscillator energized by said source, and a triggering transformer having a primary winding connected to said oscillator and having a secondary winding connected to said tube, to apply periodic discharge-initiating high-voltage surges to said tube.

4. In a capacitor flash light source as claimed in claim 1, a protective impedance in series with said source and said tube to normally prevent a direct discharge of said tube by said source, said second means being comprised of an auxiliary capacitor and series resistor connected to said source and an auxiliary gas discharge tube connected across said auxiliary capacitor, to provide a self-running relaxation oscillator, and a triggering transformer having a primary winding connected to said oscillator and having a secondary winding connected to said tube, to apply periodic discharge-initiating high-voltage surges to said tube.

5. A capacitor flash signal light source comprising a source of high voltage direct current, a capacitor, an ionic flash discharge tube containing a rarified gas, means to periodically and alternately charge said capacitor by said source and to discharge it through said tube, said tube upon direct energization by the capacitor charge being effective to produce a discharge current of relatively high peak value and short duration such as to result in a substantially non-saturated color of said flash independently of the nature of said gas, and inductive impedance means in series with said tube having a magnitude to reduce the instantaneous flash current to a value of the order of about 200 amperes and to substantially increase the flash duration such as to change from said non-saturated color to a flash of substantially saturated color characteristic of the nature of the gas contained in said tube.

6. A capacitor flash light system as claimed in claim 5, said gas consisting of neon and said inductance means having a value to result in an orange-red color of said flash.

7. A capacitor flash discharge tube as claimed in claim 5, said gas consisting of mercury and said inductance means having a value to result in a blue-green color of said flash.

8. A capacitor flash light system as claimed in claim 7, including a translucent layer of phosphorescent material upon the wall of said tube.

References Cited in the file of this patent
UNITED STATES PATENTS

| | | |
|---|---|---|
| 1,857,422 | Worrall | May 10, 1932 |
| 1,927,474 | Trucksess | Sept. 19, 1933 |
| 2,014,957 | Westendorp | Sept. 17, 1935 |
| 2,478,901 | Edgerton | Aug. 16, 1949 |
| 2,722,629 | Germeshausen | Nov. 1, 1955 |
| 2,840,763 | Rambo et al. | June 24, 1958 |
| 2,905,863 | Martin et al. | Sept. 22, 1959 |

OTHER REFERENCES

Transistor Photoflash Power Converters, by H. A. Manoogian, Electronics Engineering Issue, August 29, 1958.